(12) United States Patent
Kim et al.

(10) Patent No.: US 10,472,763 B2
(45) Date of Patent: Nov. 12, 2019

(54) ARTIFICIAL LEATHER USING POLYESTER AND MANUFACTURING METHOD THEREFOR

(71) Applicant: JEONGSAN INTERNATIONAL CO., LTD., Busan (KR)

(72) Inventors: Gu Hwan Kim, Busan (KR); Dae Young Kim, Changwon-si (KR); Choong Ryeol Park, Busan (KR)

(73) Assignee: JEONGSAN INTERNATIONAL CO., LTD., Busan (KR)

( * ) Notice: Subject to any disclaimer, the term of this patent is extended or adjusted under 35 U.S.C. 154(b) by 33 days.

(21) Appl. No.: 15/578,209

(22) PCT Filed: Aug. 8, 2016

(86) PCT No.: PCT/KR2016/008673
§ 371 (c)(1),
(2) Date: Nov. 29, 2017

(87) PCT Pub. No.: WO2017/026757
PCT Pub. Date: Feb. 16, 2017

(65) Prior Publication Data
US 2018/0148891 A1 May 31, 2018

(30) Foreign Application Priority Data

Aug. 10, 2015 (KR) .................. 10-2015-0112381

(51) Int. Cl.
*D06N 3/00* (2006.01)
*D06N 3/12* (2006.01)
*B32B 5/02* (2006.01)
*B32B 7/12* (2006.01)
*B32B 27/12* (2006.01)
*B32B 27/36* (2006.01)

(52) U.S. Cl.
CPC ............ *D06N 3/0011* (2013.01); *B32B 5/022* (2013.01); *B32B 5/024* (2013.01); *B32B 5/026* (2013.01); *B32B 7/12* (2013.01); *B32B 27/12* (2013.01); *B32B 27/36* (2013.01); *D06N 3/00* (2013.01); *D06N 3/005* (2013.01); *D06N 3/0077* (2013.01); *D06N 3/12* (2013.01); *D06N 3/123* (2013.01); *B32B 2262/0276* (2013.01); *B32B 2262/0284* (2013.01); *B32B 2307/71* (2013.01); *B32B 2307/712* (2013.01); *B32B 2307/714* (2013.01); *B32B 2437/00* (2013.01); *B32B 2601/00* (2013.01); *B32B 2605/003* (2013.01); *D06N 2203/061* (2013.01); *D06N 2213/02* (2013.01)

(58) Field of Classification Search
USPC ......................................... 428/480, 481, 482
See application file for complete search history.

(56) References Cited

U.S. PATENT DOCUMENTS 5,821,180 A * 10/1998 Iwata ................ B32B 27/12
428/292.1
2014/0079943 A1 3/2014 Feng et al.

FOREIGN PATENT DOCUMENTS

| JP | 3481766 | 10/1997 |
| JP | H9267456 | 10/1997 |
| JP | 2003201674 | 7/2003 |
| JP | 2006181782 | 7/2006 |

OTHER PUBLICATIONS

Japan Patent Office Application No. 2017-564626, Office Action dated Jan. 8, 2019, 3 pages.
European Patent Office Application Serial No. 16835397.7, Search Report dated Jan. 2, 2019, 8 pages.

* cited by examiner

*Primary Examiner* — Terressa Boykin
(74) *Attorney, Agent, or Firm* — Lee, Hong, Degerman, Kang & Waimey

(57) ABSTRACT

The present invention relates to an artificial leather using polyester, the artificial leather comprising: a base substrate layer made of a polyester fabric; an adhesive layer deposited on one surface of the base substrate layer and made of a polyester copolymer; and a skin film layer deposited on one surface of the adhesive layer and made of a polyetherester-based block copolymer.

8 Claims, 1 Drawing Sheet

ARTIFICIAL LEATHER USING POLYESTER AND MANUFACTURING METHOD THEREFOR

CROSS-REFERENCE TO RELATED APPLICATIONS

This application is the National Stage filing under 35 U.S.C. 371 of International Application No. PCT/KR2016/008673, filed on Aug. 8, 2016, which claims the benefit of earlier filing date and right of priority to Korean Application No. 10-2015-0112381, filed on Aug. 10, 2015, the contents of which are all hereby incorporated by reference herein in their entirety.

TECHNICAL FIELD

The teachings in accordance with exemplary and non-limiting embodiments of this disclosure relate generally to artificial leather using polyester and a manufacturing method thereof, and more particularly to an artificial leather using polyester useable as vehicular interior materials, furniture, shoe interior upper materials, and a manufacturing method thereof.

BACKGROUND ART

The artificial leather is used for various purposes because of having texture and tactility similar to those of the natural leather, and natural exterior appearance. The artificial leather is mainly manufactured by a method of coating polymer resin on fiber sheet, and used for various purposes such as vehicular interior materials, sofa materials for furniture, interior materials, and shoe upper materials. Particularly, the artificial leather is used recently for various usages including interior materials for railroad trains, interior materials for air planes and interior materials for ships.

The artificial leather is mostly comprised of PVC (Polyvinyl Chloride), or PU (Polyurethane), and formed with a skin layer, an adhesive layer and a base layer. The PU artificial leather is generally used with a resin mixed with a solid PU, a DMF (Dimethyleformamide) or an MEK (Methyl Ethyl Ketone). The PU artificial leather is manufactured by forming a thin film after being coated with a non-woven fabric, by mixing an additional pyroxene solvent to the resin according to the usages. When PU used for PU artificial leather is mixed with DMF, the PU artificial leather may be manufacture by using a wet process, and when the MEK is mixed, the PU artificial leather may be manufactured by using a dry process. The wet process is such that a solution mixed with PU, DMF and additive is impregnated on a raw fabric such as non-woven fabric, coated with PU mixed liquid, deposited in a coagulation bath of water and DMF mixed liquid under 30° C., and a finely porous film can be formed by substitution reaction of water and DMF. The dry process is a manufacturing method in which a mixed solution of PU resin, MEK and DMF resin is coated on a release sheet engraved with a pattern, dried with hot wind, formed with film, and adhered on a support fabric.

However, the PU artificial leather thus described suffers from disadvantages in that environmental problems arise in the manufacturing process because of using an excessive amount of organic solution and residual harmful materials (VOCs, Volatile Organic Compounds) is detected when an artificial leather is manufactured, and therefore, its use is limited. Particularly, when the PU artificial leather is used for vehicular interior materials or airplane interior materials, generation of cyanide gas during combustion, which is a toxic gas, results in problems of safety for passengers, and environmental problems are also generated during disposal.

The manufacturing method of PVC artificial leather may be categorized into two ways, that is, a calendar method in which PVC polymer is mixed, using a mixer, with a mixed solid including plasticizer, pigment, processing material and additive, and sheeted using a calendar, and a casting method in which a release sheet engraved with a pattern is coated with a mixed solution, and filmed. A sheeted PVC product thus manufactured is bonded with fabric, and surface-treated with embossed expressions.

Various types of PVC artificial leather is widely used for various usages because of being excellent in processibility and low price. However, when the PVC artificial leather is used for a long time, problems in terms of physical properties such as film peeling and generation of VOC are disadvantageously generated. Furthermore, the PVC artificial leather is used with plasticizer for softness and processibility, and the plasticizer generates an environmental hormone, a harmful material known as DEHP (Di-2 ethylhexylphtalate), and therefore, its use is strictly restricted by advanced countries in Europe and USA and by domestic car manufacturers as well. In order to solve the problems of artificial leather, waterborne PU artificial leather and high solid PU artificial leather products have been proposed, but other problems such as quality stability, limitation in physical properties, increase in price and recycling after use have emerged.

DETAILED DESCRIPTION OF THE INVENTION

Technical Subject

The technical subject of the present disclosure to the abovementioned problems/disadvantages is to provide artificial leather using polyester that is excellent in light resistance, weather resistance, durability and chemical resistance, and is recyclable and free from discharging harmful materials, and a manufacturing method thereof.

Technical Solution

In one general aspect of the present invention, there is provided an artificial leather using polyester, the artificial leather comprising:
 a base material layer formed with polyester fabric;
 an adhesive layer stacked on one surface of the base material layer and formed with polyester copolymer; and
 a skin film layer stacked on one surface of the adhesive layer and formed with polyetherester BLOCK copolymer.

Preferably, but not necessarily, the base material layer may be comprised of any one of a warp knit formed with a polyester, a circular knit napped cloth, a polyester non-woven fabric or a polyester sea-island type ultrafine fiber non-woven fabric.

Preferably, but not necessarily, the adhesive layer may be formed with a polyester copolymer lower in melting point than that of copolymer formed with the skin film layer, and the polyetherester BLOCK copolymer may be manufactured by condensation polymerization of terephthalic acid, 1,4-butanediol and polytetraethylene glycol.

Preferably, but not necessarily, the adhesive layer may be manufactured by mixing polyester copolymer and isophthalic acid.

Preferably, but not necessarily, the artificial leather may further comprise an foaming layer included between the adhesive layer and the skin film layer, and formed with polyester having a thickness of 100~300 λm and a density of 0.5~0.8 g/cm$^3$.

In another general aspect of the present disclosure, there is provided a method for manufacturing artificial leather using polyester, the method comprising:

manufacturing a skin film layer;

forming an adhesive layer by coating a hot melt adhesive on the skin film layer; and bonding the skin film layer, the adhesive layer and a base material layer by stacking the skin film layer, the adhesive layer and the base material layer while the adhesive layer and the base material layer are contacted.

Preferably, but not necessarily, the step of manufacturing the skin film layer may include:

manufacturing a BLOCK copolymer by condensation polymerization of terephthalic acid, 1,4-butanediol and polytetraethylene glycol; and manufacturing the BLOCK copolymer in a film type by T-DIE extrusion molding.

Preferably, but not necessarily, the step of forming the adhesive layer may include forming an adhesive layer by coating hot melt adhesive to the base material layer.

Preferably, but not necessarily, the step of manufacturing the BLOCK copolymer in a film type by T-DIE extrusion molding may include forming the BLOCK copolymer in a film type with a thickness of 100~300 λm by melting under 170~220° C. by putting the BLOCK copolymer into an extruder.

Preferably, but not necessarily, the bonding step may include bonding the stacked the skin film layer, the adhesive layer and a base material layer by applying a pressure of about 3.5~4.5 bar under about 120~170° C., using a heat cylinder drum.

In still another general aspect of the present disclosure, there is provided a method for manufacturing an artificial leather using polyester, the method comprising: manufacturing the skin film layer and the adhesive layer may include bonding by sequentially stacking the skin film layer, the adhesive layer and a base material layer.

Preferably, but not necessarily, the bonding step may include bonding the stacked the skin film layer, the adhesive layer and a base material layer by applying a pressure of about 3.5~4.5 bar under about 120~170° C., using a heat cylinder drum.

Preferably, but not necessarily, the step of manufacturing the skin film layer and the adhesive layer may include manufacturing, in a film type, the BLOCK copolymer and the polyester polymer simultaneously in two layers by T-DIE extrusion molding of the BLOCK copolymer and the polyester polymer, wherein the skin film layer may include a BLOCK copolymer by condensation polymerization of terephthalic acid, 1,4-butanediol and polytetraethylene glycol, and the adhesive layer may include a polyester polymer with a melting point of 100~170° C., a hardness of 20~40 D, a melt flow index (MI) of 10~50 g/10 min, and a temperature of 190° C./2.16 kg load.

Preferably, but not necessarily, the method may further comprise a surface treatment step subsequent to the bonding step, wherein the surface treatment step may include forming an embossed pattern on a surface of the skin film layer or gravure printing on the surface of the skin film layer.

Preferably, but not necessarily, the base material layer may be comprised of any one of a warp knit formed with a polyester, a circular knit napped cloth, a polyester non-woven fabric or a polyester sea-island type ultrafine fiber non-woven fabric.

Preferably, but not necessarily, the bonding step may include bonding by sequentially stacking the skin film layer, the adhesive layer and a base material layer, and inserting a blowing agent into the skin film layer and the adhesive layer.

Advantageous Effects of the Disclosure

The artificial leather using polyester according to the present disclosure has an advantageous effect in that the artificial leather can be used for vehicular interior materials, skin material for interior sofa, shoe upper materials and interior materials, because the artificial leather is excellent in light resistance, weather resistance, durability and chemical resistance, and is recyclable and free from discharging harmful materials.

BEST MODE

In the following detailed description, numerous specific details are set forth in order to provide a thorough understanding of the present disclosure. However, this disclosure may be embodied in many different forms and should not be construed as limited to any specific structure or function presented throughout this disclosure. Thus, the disclosure described herein is intended to embrace all such alternatives, modifications, variations and applications as may fall within the spirit and scope of the appended claims.

Although the terms first, second, etc., may be used herein to describe various elements, components, regions, layers and/or sections, these elements, components, regions, layers and/or sections should not be limited by these terms. These terms may be only used to distinguish one element, component, region, layer or section from another region, layer or section.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the foregoing explanations have explained that each element forming the exemplary embodiments is singly coupled or operated in combination, the present disclosure is not limited thereto. That is, one or more of the elements may be selectively combined or operated as long as within the object of the present disclosure. Furthermore, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Now, exemplary embodiments of the present disclosure will be described in detail with reference to the accompanying drawings.

Figure 1:
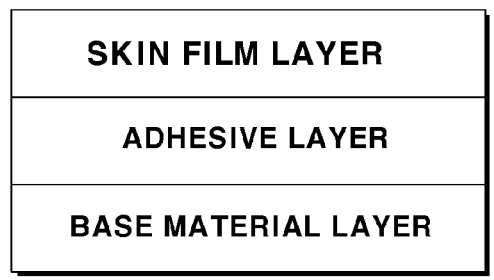
FIG. 1 is a cross-sectional view illustrating an artificial leather using polyester according to an exemplary embodiment of the present disclosure.

FIG. 1 is a cross-sectional view illustrating an artificial leather using polyester according to an exemplary embodiment of the present disclosure. The artificial leather according to the present disclosure may include a base material layer, an adhesive layer and a skin film layer.

The base material layer is a portion of base for the artificial leather, and may be any one of a warp knit formed with a single component of polyester, a circular knit napped cloth, a non-woven fabric or a polyester sea-island type ultrafine fiber non-woven fabric, but the present disclosure is not limited thereto. The base material layer may be selected in response to usage of artificial leather manufactured by the present disclosure. The artificial leather may differ in the mechanical properties required by its use, such that a base material layer must be selected in consideration of the properties. For example, in order for the artificial leather to obtain a soft texture, the base material layer may be comprised of a warp knit formed with a polyester having volume, softness and fullness, type ultrafine fiber non-woven fabric, a high density non-woven fabric, a circular knit napped cloth, or resin-filled non-woven fabric. The base material layer can maintain physical properties even if being bonded to a hot melt adhesive layer, or even if the artificial leather is compressed by pressure and temperature in the course of being embossed. The adhesive layer is a layer that is coated on one surface of the base material layer, or formed in a film type to provide adhesiveness by being bonded to the base material layer, and provides adhesiveness between the skin film layer and the base material layer. The adhesive layer may be used with a polyester lower in melting point than that of the skin film layer, and an adhesive layer may be formed by melted liquid polymer being penetrated into a fabric tissue.

Here, the adhesive may be a polyester polymer with a melting point of 100~170° C., a hardness of 20~40 D (by Shore hardness tester SHORE D), a melt flow index (MI) of 10~50 g/10 min, and a temperature of 190° C./2.16 kg load. Furthermore, in order to demonstrate the adhesiveness through thermal bonding with polyetherester BLOCK copolymer, the adhesive layer may further include diacid such as isophthalic acid, whereby an adhesive layer excellent in adhesiveness under a low temperature may be formed. At this time, content of isophthalic acid is preferably less than 15%, where if the content is increased, an adhesive temperature is reduced.

The adhesive layer may be manufactured by further including an adhesive in order to increase the adhesiveness. When the adhesive layer is formed in a film type, the adhesive layer may be formed by being extruded in a T-die method, and the base material layer may be sequentially stacked and bonded with a skin film layer and a skin film layer. However, the present disclosure is not limited thereto, and the skin film layer and the adhesive layer may be simultaneously extruded and formed, and thereafter bonded to the base material layer.

The skin film layer is a skin layer of an artificial leather using polyester. The skin film layer may be formed with polyetherester BLOCK copolymer, where the BLOCK copolymer may be manufactured by condensation polymerization of terephthalic acid, 1, 4-butanediol and polytetraethylene glycol. The skin film layer may be manufactured by T-DIE extrusion molding of BLOCK copolymer in a film type, and may demonstrate elasticity. The copolymer forming the skin film layer may be of a melting point (Tm) of 130∞220° C., preferably 150~190° C., a hardness of 20~50 D (by Shore hardness tester SHORE D), a melt flow index (MI) of 10~50 g/10 min, and a temperature of 220° C./2.16 kg load (D1238), resilience 50~80% and elongation 400~1,000%.

The skin film layer may be comprised of a hard segment which is a small crystalline portion, and a soft segment which is an amorphous portion. Thus, the soft segment portion of skin film layer is thinly and broadly distributed to hold the hard segment portion, whereby the artificial leather comes to possesses elasticity. The hard segment portion is composed of aromatic polyester, where polybutylterephthalate holds the lion's share. For example, the hard segment may be composed of a mixture of 2,6-dicarboxylic acid and derivative thereof, telephthalic acid and 1,4 butanediol. Most of the soft segment is aromatic polyester, and particularly PTMG. The skin film layer may be manufactured by adding $TiO_2$, hindered or phenol compound in order to perform functionality, whereby oxidation of artificial leather can be prevented. Furthermore, the skin film layer may be manufactured by adding sunscreen such as benzotriazole compound. The content of polyol in the soft segment may include 10~50% of the copolymer composing of an entire skin film layer. When the content of the soft segment increases, the elastic properties and softness may increase but when the content exceeds more than 50%, the hard segment, which is a crystalline portion, may decrease to deteriorate the solidifying speed, whereby it is difficult to manufacture a film and the physical properties decrease.

The artificial leather using polyester according to the present disclosure has an advantageous effect in that the skin film layer, the base material layer and the adhesive layer are all composed of polyester, which leads to easy disposal after use, and shows better physical properties than the conventional PU artificial leather.

The artificial leather using polyester according to another exemplary embodiment of the present disclosure may include a base material layer, an adhesive layer, a foaming (expandable) layer and a skin film layer. The foaming layer may be a layer formed between the skin film layer and the adhesive layer to provide an elasticity of the artificial leather and cushioning feel. The foaming layer may be formed with a thickness of 100~300 μm, and a density of 0.5~0.8 $g/cm^3$, and a foaming body may be selected from a polyester material that is most expandable in volume at 150~250° C. The base material layer, the adhesive layer and the skin film layer are as explained above.

A method for manufacturing an artificial leather using polyester according to an exemplary embodiment of the present disclosure may comprise: manufacturing a skin film layer on a surface using polyester; forming an adhesive layer by coating a hot melt adhesive on the skin film layer; and bonding the adhesive layer on a base material layer.

The step of manufacturing a skin film layer on a surface using polyester is a step for manufacturing a skin film layer which is a surface layer of the artificial leather. The step of manufacturing the skin film layer may be by extruding the polyester on a release sheet using T-DIE extrusion method.

The step of manufacturing a skin film layer on a surface using polyester may include: manufacturing a BLOCK copolymer by condensation polymerization of terephthalic acid, 1,4-butanediol and polytetraethylene glycol; and manufacturing the BLOCK copolymer in a film type by T-DIE extrusion molding. That is, the skin film layer may be composed of polyetherester BLOCK copolymer, and for example, may manufacture a BLOCK copolymer by condensation polymerization of terephthalic acid, 1,4-butanediol and polytetraethylene glycol, and manufacture the BLOCK copolymer in a film type by T-DIE extrusion molding. The copolymer is used to show flexibility and elasticity of film when the film is manufactured. Furthermore, physical properties including hardness, melting point and adhesiveness and other various characteristics can be adjusted in response to adjustment of each composition ratio and ratio of additives, when the copolymer is manufactured.

Figure 2:
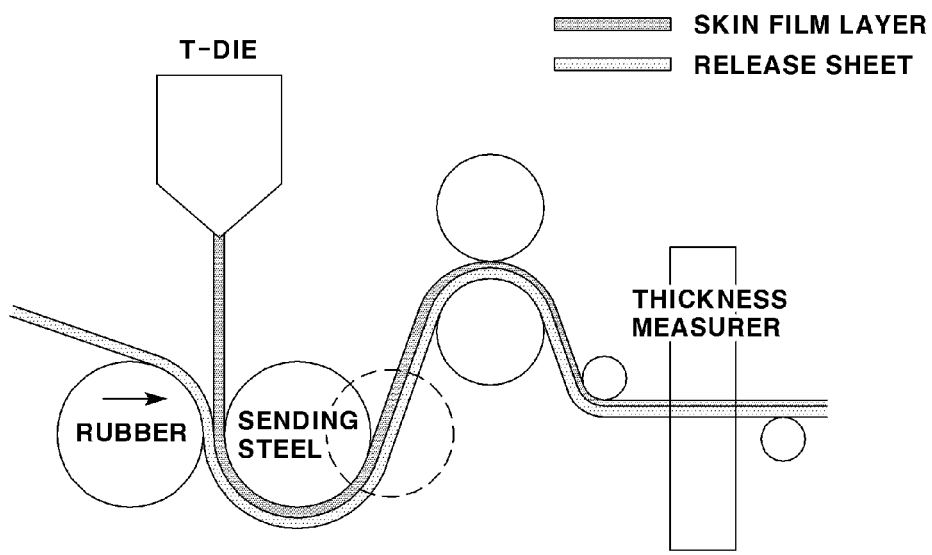
FIG. 2 is a schematic view illustrating a process to form a skin film layer in order to manufacture artificial leather according to an exemplary embodiment of the present disclosure.

FIG. 2 is a schematic view illustrating a process to form a skin film layer in order to manufacture artificial leather according to an exemplary embodiment of the present disclosure.

Referring to FIG. 2, the step of manufacturing the BLOCK copolymer in a film type by T-DIE extrusion molding may include inputting a copolymer in an extruder, melting at 170°~220° C., and extruding to a film of 50~200 m. The melted copolymer shows a flow index of 10~50 g/10 min and a load of 2.00~2.40 kg. The copolymer is extruded by a T-DIE extruder, and formed in a film type on a release sheet introduced by a counter roll (rubber roll). The extruded copolymer is formed in a film using a polypropylene of tight release type with release strength of about 1,000 g, polyester or release sheet.

The step of coating a hot melt adhesive on the skin film layer is a step of forming an adhesive layer by coating the hot melt adhesive on one surface of skin film layer, where the hot melt adhesive may provide adhesive force when being bonded with the base material layer.

The step of bonding the coated surface of hot melt adhesive of the skin film layer to the base material layer is a step of bonding the base material layer, which is a base of the artificial leather, to the skin film layer.

The base material layer may be comprised of a warp knit formed with a single component of polyester, a circular knit napped cloth and a non-woven fabric, but the present disclosure is not limited thereto. The base material layer may be selected in response to use of the artificial leather manufacture by the present disclosure, which is as what was already explained above.

The skin film layer and the base material layer are bonded by the adhesive layer formed with the hot melt adhesive. The step of bonding may be realized by applying a pressure about 3.5~4.5 bar and a temperature at about 120~170° C., using a heat cylinder drum.

The method of manufacturing the artificial leather using polyester according to the present disclosure may further comprise a surface treatment step subsequent to the bonding step, wherein the surface treatment step may include forming an embossed pattern on a surface of the skin film layer or gravure printing on the surface of the skin film layer. The method of forming an embossed pattern may be a thermal embossing method or a cooling embossing method.

A method for manufacturing an artificial leather using polyester according to another exemplary embodiment of the present disclosure may include forming by coating an adhesive layer to a base material layer using a hot melt adhesive.

A method for manufacturing an artificial leather using polyester according to still another exemplary embodiment of the present disclosure may comprise: manufacturing a skin film layer and an adhesive layer on a surface using polyester; and bonding the skin film layer and the adhesive layer to a base material layer.

The step of manufacturing a skin film layer and an adhesive layer on a surface using polyester may include manufacturing a skin film layer which is a surface layer of the artificial leather and an adhesive layer providing an adhesive force to adhere the skin film layer to the base material layer.

The method of manufacturing the skin film layer on a surface using the polyester is as what was explained above. The step of manufacturing the adhesive layer is a step of forming the polyester copolymer having adhesiveness when melted by heat in a film type. The adhesive layer may be formed of a polyester copolymer with a melting point of 100~170° C., a hardness of 20~40 D (by Shore hardness tester SHORE D), a melt flow index (MI) of 10~50 g/10 min, and a temperature of 190° C./2.16 kg load (D1238), and may be formed by being compressed in a T-DIE method.

The step of manufacturing a skin film layer and an adhesive layer on a surface using polyester may include manufacturing the skin film layer and the adhesive layer separately, and the skin film layer and the adhesive layer may be bonded at a bonding step, where two layers may be simultaneously extruded and formed by a T-DIE method.

The step of bonding the skin film layer and the adhesive layer to the base material layer is a step of stacking the adhesive layer on the base material layer, to which the skin film layer is stacked and bonding by applying heat and pressure. At this time, the heat and pressure may be changed depending on the melting point of the adhesive layer, where the bonding may be implemented at a temperature of 120~170° C. and a pressure of about 3.5~4.5 bar.

When the skin film layer and the adhesive layer are simultaneously extruded and formed in a two-layer manner by a T-DIE method, the adhesive layer is stacked by being contacted to the base material layer to which heat and pressure are applied for bonding.

A method for manufacturing an artificial leather using polyester according to still another exemplary embodiment of the present disclosure may comprise: manufacturing a skin film layer and an adhesive layer on a surface using polyester; stacking the skin film layer and the adhesive layer and inserting a blowing agent into between the skin film layer and the adhesive layer; and bonding the stacked skin film layer and adhesive layer to a base material layer.

The step of manufacturing the skin film layer and the adhesive layer on a surface using the polyester and the step of stacking and bonding the base material layer to the adhesive layer according to the method for manufacturing an artificial leather using polyester are as already explained above.

The step of stacking the skin film layer and the adhesive layer and inserting a blowing agent into between the skin film layer and the adhesive layer is a step for forming a blowing layer in order to make the artificial leather excellent in elasticity. It is possible to insert a capsule-type blowing agent into between the skin film layer and the adhesive layer, where the blowing agent may be blown at the time of extrusion at the bonding step to form a blowing layer.

Amount and component of a blowing agent must be so adjusted as to allow a blowing layer to have a thickness of 100~300 μm and a density of 0.5~0.8 g/cm$^3$, where the blowing agent may be a blowing agent of polyester material.

Furthermore, the blowing agent may be selected from materials that can be best expanded in volume at a temperature of 150~250° C.

A method for manufacturing an artificial leather using polyester according to still another exemplary embodiment of the present disclosure may comprise forming a blowing layer for insertion into between the skin film layer and the adhesive layer. That is, a blowing agent does not form a blowing layer at a bonding step, but the bonding may be implemented by a film layer being formed using the blowing agent.

Although the abovementioned embodiments according to the present disclosure have been described in detail with reference to the above specific examples, the embodiments are, however, intended to be illustrative only, and thereby do not limit the scope of protection of the present disclosure. Thereby, it should be appreciated by the skilled in the art that changes, modifications and amendments to the above examples may be made without deviating from the scope of protection of the disclosure.

The invention claimed is:

1. An artificial leather manufactured using polyester, the artificial leather comprising:
    a base material layer formed with polyester fabric;
    an adhesive layer stacked on one surface of the base material layer and formed with polyester copolymer; and
    a skin film layer stacked on one surface of the adhesive layer and formed with polyetherester BLOCK copolymer,
    wherein the adhesive layer is manufactured by mixing the polyester copolymer and isophthalic acid,
    wherein a melting point of the polyester copolymer is lower than a melting point of the polyetherester BLOCK copolymer,
    wherein the polyetherester BLOCK copolymer is manufactured by condensation polymerization of terephthalic acid, 1,4-butanediol and polytetraethylene glycol, and
    wherein the polyetherester BLOCK copolymer has a melting point (Tm) of 150~190° C., a hardness of 20~50D (by Shore hardness tester SHORE D), and a melt flow index (MI) of 10~50 g/10 min.

2. The artificial leather of claim 1, wherein the base material layer is comprised of any one of a warp knit formed with polyester, a circular knit napped cloth, a polyester non-woven fabric or a polyester sea-island type ultrafine fiber non-woven fabric.

3. The artificial leather of claim 1, further comprising a foaming layer included between the adhesive layer and the skin film layer, and formed with polyester having a thickness of 100~300 μm and a density of 0.5~0.8 g/cm$^3$.

4. A method for manufacturing an artificial leather using polyester, the method comprising:
    manufacturing a skin film layer and an adhesive layer; and
    bonding the skin film layer, the adhesive layer and a base material layer by sequentially stacking the skin film layer, the adhesive layer and the base material layer,
    wherein the manufacturing of the skin film layer and the adhesive layer includes manufacturing, in a film type, a polyetherester BLOCK copolymer and a polyester polymer simultaneously in two layers by T-DIE extrusion molding of the BLOCK copolymer and the polyester polymer,
    wherein the skin film layer includes the polyetherester BLOCK copolymer having a melting point (Tm) of 150~190° C., a hardness of 20~50D (by Shore hardness tester SHORE D), and a melt flow index (MI) of 10~50 g/10 min,
    wherein the polyetherester BLOCK copolymer is manufactured by condensation polymerization of terephthalic acid, 1,4-butanediol, and polytetraethylene glycol,
    wherein the adhesive layer includes the polyester polymer having a melting point of 100~170° C., a hardness of 20~40D, a melt flow index (MI) of 10~50 g/10 min, and a temperature of 190° C./2.16 kg load,
    wherein the adhesive layer is manufactured by mixing the polyester copolymer and isophthalic acid, and
    wherein the melting point of the polyester copolymer is lower than the melting point of the polyetherester BLOCK copolymer.

5. The method of claim 4, wherein the bonding step includes bonding the stacked skin film layer, adhesive layer and base material layer by applying a pressure of about 3.5~4.5 bar under about 120~170° C., using a heat cylinder drum.

6. The method of claim 4, further comprising a surface treatment step subsequent to the bonding step, wherein the surface treatment step includes forming an embossed pattern on a surface of the skin film layer or gravure printing on the surface of the skin film layer.

7. The method of claim 4, wherein the base material layer is comprised of any one of a warp knit formed with a polyester, a circular knit napped cloth, a polyester non-woven fabric or a polyester sea-island type ultrafine fiber non-woven fabric.

8. The method of claim 4, wherein the bonding step includes bonding the stacking the skin film layer, the adhesive layer and the base material layer by sequentially stacking the skin film layer, the adhesive layer and the base material layer, and inserting a blowing agent into the skin film layer and the adhesive layer.

* * * * *